Aug. 1, 1933.   H. HARTER   1,920,858
PROCESS OF CONVERTING GASES RICH IN METHANE INTO MORE VALUABLE PRODUCTS
Filed Feb. 14, 1929
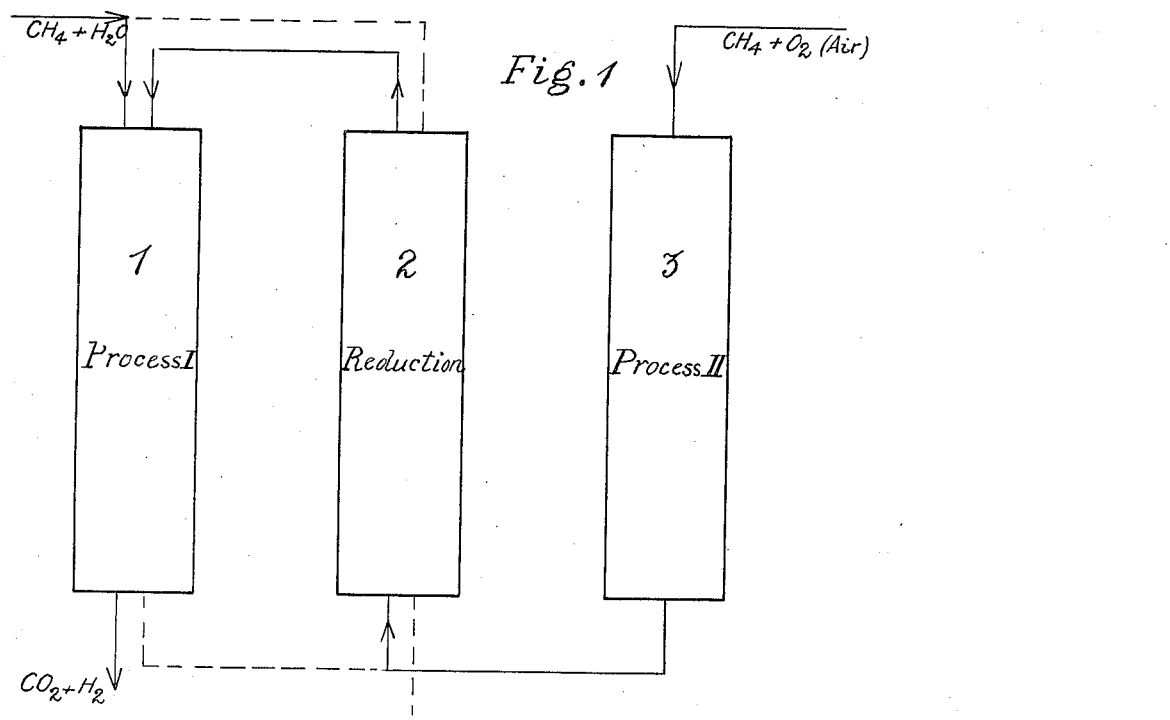
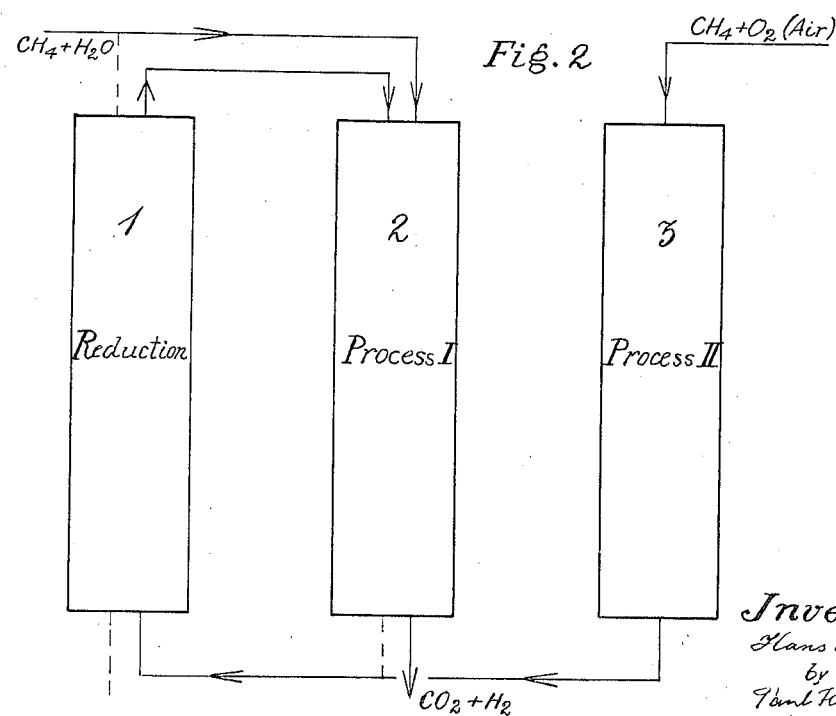
Inventor:
Hans Harter
by
Paul Kirkland
Attorney Patented Aug. 1, 1933

1,920,858

UNITED STATES PATENT OFFICE 1,920,858

PROCESS OF CONVERTING GASES RICH IN METHANE INTO MORE VALUABLE PRODUCTS

Hans Harter, Wurzburg, Germany

Application February 14, 1929, Serial No. 339,962, and in Germany February 16, 1928

11 Claims. (Cl. 23—212)

This invention relates to the conversion of high-grade methane or natural gas into more valuable products, especially hydrogen. In the process of producing hydrogen from coke oven gases by liquefying the same, an important quantity of methane is obtained as a by-product. This methane was hitherto utilized, with little profit, almost exclusively for heating purposes.

Now I have found that this methane which is chemically almost pure and contains only insignificant quantities of ethylene, carbon monoxide and sometimes nitrogen, may be utilized with considerable profit for the production of hydrogen, or nitrogen and hydrogen to be used in the synthesis of ammonia, as well as for the production of carbon monoxide and hydrogen to be used for recovering liquid hydrocarbons &c. For this purpose it is by no means necessary to transform the whole of the methane into hydrogen and carbon dioxide or into hydrogen and carbon monoxide when employing the hydrogen thus obtained for the synthesis of ammonia, provided that this synthesis is carried out according to my German Patents Nos. 387,883 and 389,297 or generally speaking according to the "high-pressure-synthesis". On the contrary, a certain percentage of the methane may be preserved as such, in this case. The same applies to the production of carbon monoxide and hydrogen from this high-grade methane for producing liquid hydrocarbons.

According to my invention the high-grade methane is converted into hydrogen and carbon monoxide or dioxide in two parallel processes by different means.

In the first process, for instance, hereafter designed by I, one part of the high-grade methane is transformed in the well known manner in presence of catalysts into carbon dioxide and hydrogen, or carbon monoxide and hydrogen, according as these gases are to be utilized for the synthesis of ammonia or for hydrogenating purposes. In a second parallel process hereafter designated by II another part of the methane is treated with oxygen or oxygenated air, with or without catalysts, in such a manner that substantially carbon monoxide and hydrogen are produced, without the necessity of transforming the whole of the methane into these gases.

This gas mixture obtained by process II after having left the oxidation apparatus is utilized for reducing the catalysts, for instance, consisting of iron, which has been used in process I. The resulting gas substantially consisting of carbon dioxide, hydrogen, nitrogen, steam and methane, is either, after separation of carbon dioxide and steam directly, utilized for the ammonia synthesis, or it is admixed, either with the carbon dioxide present or after absorbing the same, to the methane-steam mixture used in process I. The amount of methane still present in the reducing gas may be oxidized to carbon dioxide and hydrogen, so that in this case, after removal of the carbon dioxide and steam, chemically pure hydrogen or a chemically pure mixture of nitrogen and hydrogen is obtained. The mixture of carbon dioxide and hydrogen &c. obtained according to process I may also be passed over heated carbon, especially so-called reducible carbon, whereby a mixture of carbon monoxide and hydrogen is obtained, which, in its turn, may be utilized either alone or in connection with the reducing gas obtained according to process II either alone or with the admixture of hydrogen for producing liquid hydrocarbons, or the gas obtained according to process I, if consisting substantially of carbon monoxide and hydrogen, may be utilized for producing liquid hydrocarbons. The gas obtained by process II may be utilized likewise as that obtained by process I as reducing gas in the steam-iron process.

This new process presents the great advantage that, in contradistinction to the known processes of this kind, after removal of carbon dioxide and steam I obtain, without any further refinement a gas mixture, useful for the ammonia synthesis and for the production of liquid hydrocarbon.

A plant for carrying out my invention is diagrammatically illustrated in the annexed drawing of which Figs. 1 and 2 show the alternating connection of the apparatus in process I.

For carrying out the process three oxidation vessels, 1, 2 and 3 are employed.

The vessels 1 and 2 are formed by ordinary iron tubes filled with a catalytic mass, or preferably by a plurality of catalytic cells arranged in series in a common pressure tube, as described in my copending application Ser. No. 291,302. As catalytic mass, for instance, a compound may be employed which is produced by introducing into molten iron small quantities of difficultly reducible metallic oxides as: tungstenic oxide, molybdic oxide, calcium oxide, magnesium oxide &c. or fire clay or other silicious materials or an oxide and a silicious material with the admixture of ferric oxide, and other oxides easily reducible by hydrogen, comminuting this mass and reducing it by hydrogen, if desired.

Through these two vessels 1 and 2 a mixture of methane and steam, with or without the addition of air or oxygen, is passed, alternating with the reducing gas obtained in vessel 3, a temperature between 500 and 900° C. being maintained.

In the vessels 1 and 2 methane is transformed alternately by steam or steam in connection with air or oxygen to carbon dioxide or monoxide and hydrogen, and the resulting ferric oxide is reduced to metal by the reducing gas produced in vessel 3.

In this vessel which may be constructed similar to vessels 1 and 2 but may also be of the type described in my copending application Ser. No. 291,302 a further quantity of the high-grade methane is treated with oxygen with or without catalytic substances, in such a way that a gas mixture substantially consisting of carbon monoxide, hydrogen, and undecomposed methane is formed. As catalytic substances: nickel, cobalt, copper, manganese, silver &c. are employed in the well known manner either singly or in the form of contact pairs. The resulting gas mixture is, as already mentioned, employed for reducing the ferric oxide formed in the vessels 1 and 2 in process I.

Instead of oxygen, air enriched with oxygen may be employed in process II, the relation of oxygen and methane being preferably so calculated that the gas mixture, obtained by the reduction in the vessels 1 and 2 after the removal of the carbon dioxide, contains hydrogen and nitrogen approximately in the proportion of 1 : 3. This gas mixture may directly be used for the ammonia synthesis without the necessity of removing the remainder of the methane still present. When such a gas has passed the last of the serially connected batteries in the ammonia synthesis, the remaining gas in which methane has been enriched to a certain degree may be returned to process I, or it may be added, as already mentioned, for the complete combustion of the methane etc., to the methane-steam-air mixture according to process I.

After removal of the carbon dioxide in the last case I likewise obtain a mixture of nitrogen, hydrogen, and steam which after the condensation of the steam, may be employed for the ammonia synthesis either as it is or after the admixture of further quantities of nitrogen.

Both oxidation processes may be advantageously carried out under pressure of at least 20 to 100 Atm. or more, whereby the hydrogen or the mixture of nitrogen, hydrogen and methane, or the mixture of carbon monoxide, hydrogen and methane are obtained in a compressed state, and their use for the ammonia synthesis and for the production of liquid hydrocarbons is facilitated. Moreover, in this way, the size of the plant is considerably reduced.

Of course, my process may be employed for utilizing gas mixture containing considerable quantities of methane and other hydrocarbons.

Instead of an iron catalyst a highly activated carbon may be used as a catalyst in process I, in which case only temperatures between 300 and 500° C. are required. The decomposition of the methane into carbon dioxide and hydrogen can be considerably accelerated by employing so-called contact pairs consisting, for instance, of activated carbon and another or more catalysts, such as iron, nickel, cobalt, manganese &c. or compounds of these metals, especially their oxides or carbonates.

In like manner the gas mixture obtained by processes I and II, as above described, and consisting of carbon monoxide and hydrogen or carbon monoxide, carbon dioxide, hydrogen, methane and nitrogen, may be transformed at the indicated low temperatures, into a mixture of hydrogen and carbon dioxide, or hydrogen, nitrogen and carbon dioxide. In the same way the above-mentioned mixture of nitrogen, hydrogen, and methane, after having passed the last battery of the catalytic apparatus in the ammonia synthesis and thereby having been enriched with methane, may be treated and thus transformed into a mixture of carbon dioxide, hydrogen and nitrogen, which, in its turn, after removing the carbon dioxide, may be returned to the gases to be synthesized.

Instead of highly activated carbon, so-called reducible carbon, such as amorphous coal, brown coal coke &c. may be used, either alone or in combination with other catalytic substances of the above described kind.

For regenerating these catalysts, the gas mixture, obtained by process II and consisting of carbon monoxide and hydrogen, is conducted over the exhausted combined catalysts, whereupon the products are treated for a short time with steam or a mixture of steam and air.

Other gas mixtures rich in methane, such as coke oven gases, water gas, producer gas &c. may be treated in the same manner as methane.

In the process just described, hydrogen, produced by the oxidation of carbon by means of steam, is present besides the hydrogen formed from methane and steam, if an excess of steam or of steam and air was employed. Of course, hydrogen and carbon dioxide may also be produced at 400 to 500° C. by treating with steam highly activated carbon alone or combined with other contact substances as iron, nickel, cobalt, manganese or their compounds.

The hydrogen or the mixture of hydrogen and nitrogen, as obtained in this case after absorbing the carbon dioxide, may be conducted over highly activated carbon at room-temperature for completely eliminating the organic sulphur &c. in all cases in which these gases are employed for the ammonia synthesis, the carbon monoxide which might be present being previously transformed into hydrocarbons by well known methods. A small amount of methane and even of carbon monoxide does no harm provided that the hydrogen or the mixture of hydrogen and nitrogen is used in the above-mentioned process of making ammonia by synthesis.

By further investigation I have found that process I can be rendered continuous by employing one single vessel and introducing the waste gases—coming from process II, but without oxygen, or with an amount of oxygen not sufficient for the combustion of the carbon monoxide and hydrogen—into the vessel 1 of Fig. 1 in a quantity, which is to be regulated according to the composition of the waste gases leaving this vessel. Hereby the catalytic mass in vessel 1 is reduced, carbon monoxide being burnt to carbon dioxide.

The heating for starting the process I is effected, in this case, by producing the required quantity of carbon monoxide and hydrogen according to process II, and introducing this mixture together with a sufficient quantity of oxygen into vessel 1 where it is burnt to carbon dioxide and steam. After the required reaction temperature is attained, the supply of these waste gases is correspondingly decreased.

For maintaining the temperature required in process I at an almost constant level during the operation of vessel 1, without the external supply of heat, and for rendering the process I a completely continuous one without using a second apparatus, it is only necessary to continually introduce the waste gases from process II, in determined quantities, into the reaction vessel of process I, in such a way that the produced heat is transferred as well by transmission as especially by radiation to the contact substance in process I. If the whole caloric energy of the waste gases is to be utilized, an amount of oxygen, sufficient for oxidizing the carbon monoxide and hydrogen to carbon dioxide and water, is introduced; otherwise the percentage of the oxygen is so calculated as to oxidize only the carbon monoxide to carbon dioxide. When however the waste gases from process II are to act as reducing gas, they are introduced in accordance with the analytic control of the waste gases from process I, however without the admixture of oxygen, or only with an amount of oxygen not sufficient for the combustion of the whole carbon monoxide. In this manner the heating and the reduction of the contact mass may be carried out simultaneously and continuously. Of course, the heating in process I may also be effected by means of methane or natural gas. The reduction and the oxidation process being exothermic reactions, the heat conditions in process I are easily regulated, the more so, since, in both processes I and II the waste gases are employed for preheating the methane and the oxidants in a heat exchanger or another suitable device. In this way the treatment of high-grade methane or natural gas is independent of any other source of carbon for heating and reduction. Instead of oxygen, air or air enriched with oxygen may be employed for heating.

For carrying out the last-mentioned modification of my invention, two to three oxidation apparatuses, connected in series, are preferably employed.

Of course, this process is applicable to all cases where, in an oxidation process for regenerating the contact substances employed, a reduction is required, and for this reduction carbon monoxide and hydrogen can be used, for instance, in the so-called iron-steam process for producing hydrogen.

The following catalysts have proved extremely suitable for the just described continuous process:

A mixture of nearly equal parts of copper and copper oxide is intimately mixed, either alone or in combination with a mixture of nearly equal parts of iron and iron oxide, or nickel and nickel oxide, and this mixture is mixed with a binder, and bake, whereby a highly porous mass is obtained, which offers a large surface to the gases flowing through and therefore is distinguished by a high activity. Instead of mixing copper, copper oxide, iron, iron oxide, nickel and nickel oxide, the said oxide may be produced by complete or incomplete oxidation of easily decomposable compounds of the said metal, for instance, from ferric nitrate and copper carbonate, or from ferrous oxalate with copper formiate &c. and the mixture of oxides may be wholly or partially reduced. Preferably activators and a certain percentage of calcium carbide may be added to these contact substances.

Furthermore the methane-steam process for producing hydrogen may be simplified in a profitable manner by combining the same with the synthesis of formaldehyde from methane and oxygen or air.

It is well known that in this formaldehyde process besides formaldehyde considerable quantities of carbon monoxide and hydrogen and, in some cases, carbon dioxide are formed. As owing to the relatively small out-put of formaldehyde, large volumes of gas are to be kept in circulation, the reaction mixture is soon deteriorated by inert gases, as carbon monoxide and hydrogen so that large parts of the gas mixture must be withdrawn from the circle in relatively short intervals. This gas was hitherto generally utilized for heating purposes.

According to my invention, these gases, after the carbon monoxide and hydrogen have been enriched to such an extent that the production of formaldehyde begins to decrease, are conducted to vessel 1 where they are burnt to hydrogen and carbon dioxide. These gases may also be employed without the addition of oxygen instead of the waste gases from process II as reducing gas or with oxygen as heating gas in process I.

In this way it is possible, either to treat a smaller quantity of methane according to process II or, if it is not desired to reduce this quantity, to employ these waste gases for other purposes, for instance, for producing liquid hydrocarbons.

A further advantage of this combination consists in obtaining a uniform concentration of formaldehyde.

*Examples*

1. Nearly pure methane and oxygen are conducted at about 800 to 900° C. over contact masses, as above described. The resulting gas mixture is composed as follows: (process II):

| | Per cent |
|---|---|
| Hydrogen | 57.70 |
| Carbon oxide | 29.30 |
| Methane | 7.90 |
| Carbon dioxide | 4.10 |
| Oxygen | 1.0 |
| | 100.0 |

This mixture is then used as heating and reducing gas in process I. The waste gases of this heating and reducing period are composed as follows:

| | Per cent |
|---|---|
| Hydrogen | 48.40 |
| Carbon dioxide | 50.50 |
| Carbon oxide | 0.8 |
| Methane | 0.3 |
| And traces of oxygen. | |
| | 100.0 |

In the following period (process I) methane and steam (in some cases with the assistance of oxygen and air) react at 700° C. and in presence of catalysts as above described. The waste gases contain:

| | Per cent |
|---|---|
| Hydrogen | 83.3 |
| Carbon dioxide | 16.3 |
| Carbon oxide | 0.5 |

Traces of methane and oxygen.

From the fore-going and the following examples it appears that the combustion of methane to hydrogen according to my invention is complete and not only in the main process but also in the heating and regenerating process large quantities of hydrogen are produced.

2. A mixture of methane and oxygen is treated exactly as in Example 1, so that a gas mixture of the same composition is formed (process II).

This gas mixture is again used as an Example 1 for heating and reduction, however in this case, not oxygen but air is used as oxidizing agent, so that the waste gases of this period contain nitrogen besides hydrogen and carbon dioxide:

|  | Per cent |
|---|---|
| Hydrogen | 26.20 |
| Carbon dioxide | 27.40 |
| Nitrogen | 45.30 |
| Carbon oxide | 0.80 |
| Methane | 0.30 |
| Traces of oxygen. | |
|  | 100.0 |

The methane-steam period of process I furnishes again a gas of the following composition:

|  | Per cent |
|---|---|
| Hydrogen | 83.0 |
| Carbon dioxide | 16.30 |
| Carbon oxide | 0.5 |
| Traces of methane, oxygen and nitrogen. | |
|  | 100.0 |

The last two gas mixtures are now mixed before or after the separation of the carbon dioxide, monoxide, etc. and a gas is finally obtained which contains besides quantities of methane, nitrogen and hydrogen in the proportion 1:3 and therefore is without further preparation ready for use in the ammonia synthesis.

3. From methane and oxygen the same gas mixture is obtained as in Example 1 (process II). This mixture is again used as heating and reducing gas in the methane-steam process (I). However it is not periodically but continuously introduced into process I so that the heating and the reducing operation takes place simultaneously with process I. Of course, oxygen or air or air enriched with oxygen may be employed as oxidizing agent.

(a) *With oxygen.*—A gas is obtained showing the following composition:

|  | Per cent |
|---|---|
| Hydrogen | 74.8 |
| Carbon dioxide | 24.3 |
| Carbon oxide | 0.7 |
| Methane | 0.2 |
| Traces of oxygen. | |

(b) *With air, as oxidizing agent.*—The following composition is obtained:

|  | Per cent |
|---|---|
| Hydrogen | 59.5 |
| Carbon dioxide | 21.2 |
| Nitrogen | 19.5 |
| Carbon oxide | 0.6 |
| Traces of methane and oxygen. | |
|  | 100.0 |

After removal of the carbon dioxide and a little amount of carbon monoxide I obtain in Example (3a) pure hydrogen and in Example (3b) a mixture of nitrogen and hydrogen in the proportion of 1:3 as required in the ammonia synthesis.

I claim:—

1. The process of producing gases containing hydrogen by converting gases rich in methane, which comprises mixing with steam a portion of the gas to be treated, passing the mixture over a heated ferriferous catalyst in a first apparatus to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

2. The process of producing gases containing hydrogen by converting gases rich in methane, which comprises mixing with steam and air a portion of the gas to be treated, passing the mixture over a heated catalyst in a first apparatus to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

3. The process of producing gases containing hydrogen by converting gases rich in methane, which comprises mixing with steam a portion of the gas to be treated, passing the mixture over a heated catalyst in a first apparatus to produce hydrogen and carbon dioxide, mixing another portion of the gas to be treated with oxygen and heating the mixture in a contact furnace to produce carbon monoxide and hydrogen, and passing the resulting mixture over the catalyst in the first apparatus, whereby this catalyst is heated and reduced.

4. The process of producing gases containing hydrogen by converting gases rich in methane, which comprises mixing with steam a portion of the gas to be treated, passing the mixture over a heated catalyst in a first apparatus to produce hydrogen and carbon dioxide, mixing another portion of the gas to be treated with a gas rich in oxygen and heating the mixture in a second apparatus to produce carbon monoxide and hydrogen, mixing the products of the process carried out in the second apparatus with a quantity of oxygen not sufficing for complete combustion, and continuously introducing the mixture into the first apparatus.

5. The process of producing gases containing hydrogen by converting gases rich in methane, which comprises mixing with steam a portion of the gas to be treated, passing the mixture over a heated catalyst in a first apparatus to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus, the said reactions being carried out under elevated pressure.

6. The process of producing gases containing hydrogen by converting gases rich in methane, which comprises mixing with steam a portion of the gas to be treated, passing the mixture over a heated catalyst in a first apparatus, said catalyst mainly consisting of metallic iron in which difficulty reducible metallic oxides and oxides easily reducible by hydrogen are distributed, to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

7. The process of producing gases containing hydrogen by converting gases rich in methane, which comprises mixing with steam a portion of the gas to be treated, passing the mixture over a heated catalyst in a first apparatus, said catalyst mainly consisting of metallic iron and a siliceous substance in which difficultly reducible metallic oxides and oxides easily reducible by hydrogen are distributed, to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

8. The process of producing gases containing hydrogen by converting gases rich in methane, which comprises mixing with steam a portion of the gas to be treated, passing the mixture over a heated catalyst in a first apparatus, said catalyst being a mass containing iron, copper, nickel and their oxides, with the addition of a binding substance, to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

9. The process of producing gases containing hydrogen by converting gases rich in methane, which comprises mixing with steam a portion of the gas to be treated, passing the mixture over a heated catalyst in a first apparatus, said catalyst being a mass containing iron, copper, nickel and their oxides, an activator and calcium carbide, with the addition of a binding substance, to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

10. The process of producing gases containing hydrogen by converting gases rich in methane, which comprises mixing with steam a portion of the gas to be treated, passing the mixture over a metallic catalyst mainly consisting of metallic iron in which difficultly reducible metallic oxides and oxides easily reducible by hydrogen are distributed and highly activated carbon at temperatures between 300 and 500° C. in a first apparatus to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

11. The process of producing gases containing hydrogen by converting gases containing hydrocarbons, which comprises mixing with steam a portion of the gas to be treated, passing the mixture over a heated catalyst in a first apparatus to produce hydrogen and carbon dioxide, mixing another portion of the gas to be treated with a gas rich in oxygen and heating the mixture in a second apparatus to produce carbon monoxide and hydrogen, and utilizing the products of the process carried out in the second apparatus for reducing and heating the catalytic substances in the first apparatus.

HANS HARTER.